United States Patent [19]

Morgan et al.

[11] Patent Number: 4,462,605
[45] Date of Patent: Jul. 31, 1984

[54] WHEELCHAIR HAVING ANTI-ROLLBACK MECHANISM

[75] Inventors: Kenneth S. Morgan, Huntington, N.Y.; James W. Brazell, Atlanta, Ga.

[73] Assignee: Georgia Tech Research Institute, Atlanta, Ga.

[21] Appl. No.: 508,603

[22] Filed: Jun. 28, 1983

Related U.S. Application Data

[63] Continuation of Ser. No. 268,831, May 29, 1981, abandoned.

[51] Int. Cl.³ .................. B62M 1/14; B60B 19/00
[52] U.S. Cl. ............................ 280/242 WC; 180/10; 188/82.3; 188/82.84; 297/DIG. 4; 305/7; 308/182
[58] Field of Search ............ 280/242 R, 242 WC; 180/10; 305/6, 7, 18; 308/182; 297/DIG. 4; 295/10; 188/82.1, 82.3, 82.84, 2 F; 192/41 R, 41 A, 45; 74/144

[56] References Cited

U.S. PATENT DOCUMENTS

| | | | |
|---|---|---|---|
| 521,463 | 6/1894 | Smith-Fraser | 297/183 |
| 756,658 | 4/1904 | Lange | 308/182 |
| 2,060,376 | 11/1936 | Jex | 188/82.84 |
| 2,426,451 | 8/1947 | Hammack | 188/2 F |
| 2,667,945 | 2/1954 | Caldeira | 188/2 F |
| 2,754,947 | 7/1956 | Marsden | 188/82.84 |
| 2,782,870 | 2/1957 | Sill | 188/2 F |
| 2,859,837 | 11/1958 | Mize | 188/2 F |
| 3,104,112 | 9/1963 | Crail | 280/5.2 |
| 3,285,675 | 11/1966 | Tucker, Jr. | 305/18 |
| 3,302,757 | 2/1967 | Eagleson, Jr. | 188/167 |
| 3,623,748 | 11/1971 | Haynes | 280/202 |
| 3,869,146 | 3/1975 | Bulmer | 280/242 WC |
| 3,877,725 | 4/1975 | Barroza | 280/242 WC |
| 4,039,199 | 8/1977 | Quinby | 280/242 WC |
| 4,045,047 | 8/1977 | Buckley | 280/242 WC |
| 4,101,143 | 7/1978 | Sieber | 280/42 |
| 4,204,588 | 5/1980 | Kawecki | 188/2 F |

FOREIGN PATENT DOCUMENTS

| | | | |
|---|---|---|---|
| 15397 | of 1905 | United Kingdom | 280/242 WC |
| 2034427 | 6/1980 | United Kingdom | 188/2 F |
| 2043554 | 10/1980 | United Kingdom | 180/10 |

*Primary Examiner*—David M. Mitchell
*Assistant Examiner*—Kenneth R. Rice
*Attorney, Agent, or Firm*—Newton, Hopkins & Ormsby

[57] ABSTRACT

The propulsion wheels of a manually propelled wheelchair are equipped with one-way engaging and one-way freewheeling clutch devices which cooperate with races fixed to the wheelchair frame, whereby unwanted backward movement of the wheelchair is prevented and forward movement at all times is enabled. An override mechanism including a spider attached to each hand propulsion ring disables the one-way engaging clutch devices when the wheelchair occupant intentionally moves the propulsion wheels in a backward mode. No controls separate from the manual propulsion wheels are present, assuring the chair occupant constant control of the chair through the hand propulsion rings at all times.

14 Claims, 7 Drawing Figures

WHEELCHAIR HAVING ANTI-ROLLBACK MECHANISM

The Government has rights in this invention pursuant to Contract No. V508P-587, awarded by the Veteran's Administration.

This is a continuation of application Ser. No. 268,831, filed May 29, 1981, now abandoned.

BACKGROUND OF THE INVENTION

Manually propelled wheelchairs equipped with various forms of brakes or control devices are known in the prior art. The most common device consists of a lever operated brake shoe which engages the tire of the wheelchair propulsion wheel to lock such wheel against movement at required times. This arrangement has at least two serious disadvantages. First, the chair occupant must remove his or her hand from the manual propulsion ring of the wheel in order to operate the control lever or mechanism, with the possibility of losing control of the wheelchair. Secondly, the prior art devices cause excessive tire wear and damage, resulting in premature tire failure and expense.

The invention herein completely overcomes these prior art difficulties through provision of a reliable, simple and positive acting anti-rollback mechanism built integrally into the wheelchair propulsion wheels, thus completely eliminating any external controls which require the chair occupant to release the hand rings on the wheels in order to operate the secondary control mechanism.

Briefly stated, the mechanism according to the invention consists of one-way engaging and one-way freewheeling clutch units on the wheelchair propulsion wheels which follow a stationary annular race adjacent each wheel and fixed to the chair frame. Each clutch has associated with it a rotational locking or stop device whose action assures that undesired backward rolling of the wheelchair cannot occur when the clutches are engaged.

A simple override mechanism enables intentional backward rolling of the wheelchair under positive control of the occupant through use of the wheel mounted hand propulsion rings at any time. A spider fixed to each propulsion wheel has a connection with an override means which releases the locking or stop device when manual force in the reverse direction is exerted on the hand ring by the chair occupant. Releasing of the hand ring reactivates the automatic anti-rollback mechanism. Free forward movement of the chair is enabled at all times. No tire wear is involved with the invention and positive control over the chair by its occupant is assured because the hands need never be removed from the manual propulsion rings.

Other features and advantages of the invention will become apparent during the course of the following description.

Detailed Description

Figure 1:
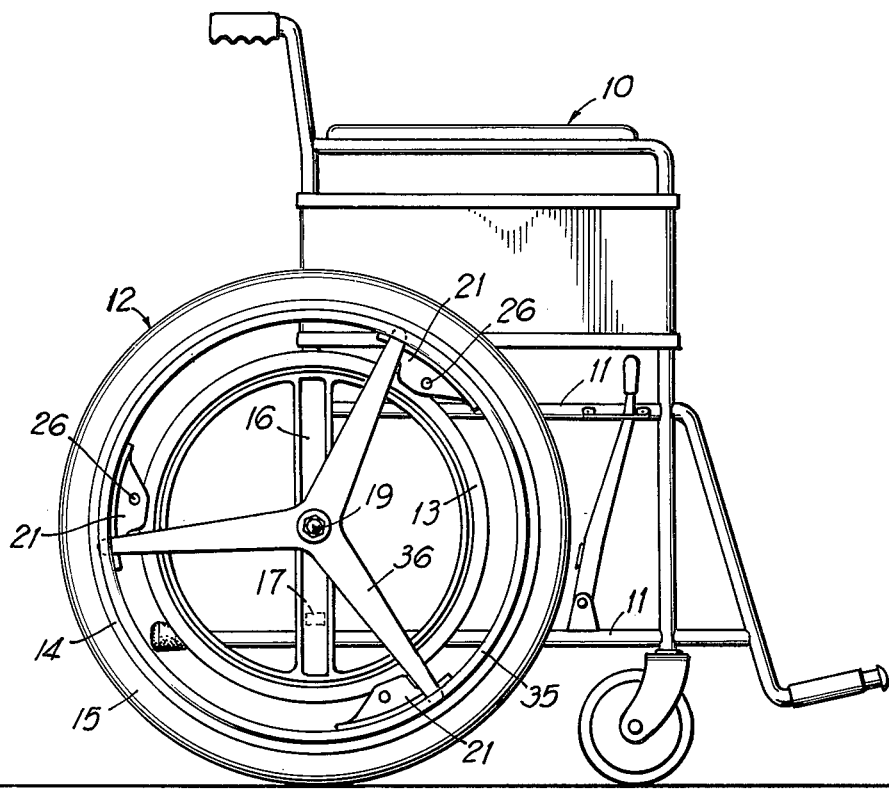
FIG. 1 is a side elevation of a wheelchair equipped with the invention.
Figure 2:
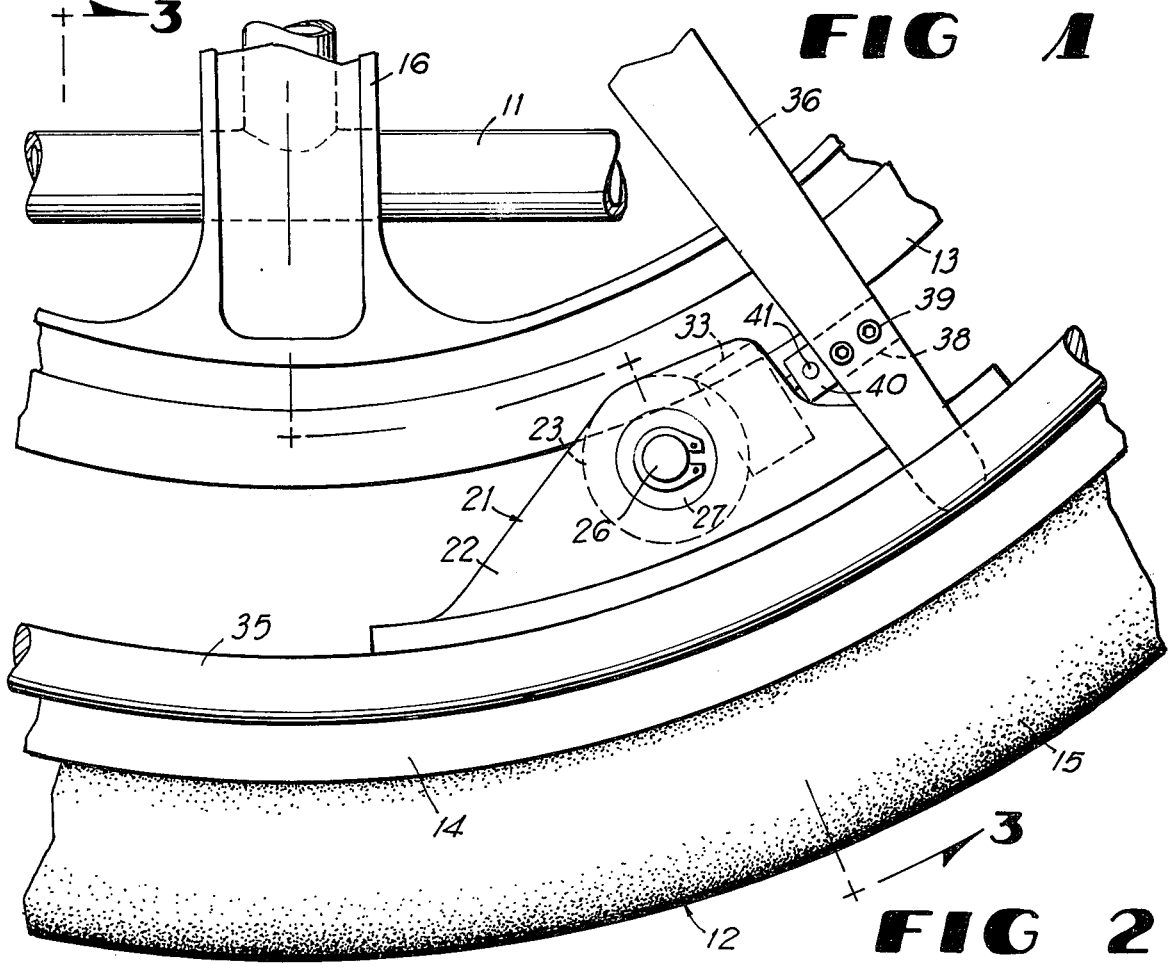
FIG. 2 is an enlarged fragmentary side elevation of one propulsion wheel and associated anti-rollback mechanism forming the subject matter of the invention.

Referring to the drawings in detail, the numeral 10 denotes a manually propelled wheelchair having a rigid frame 11, the chair being conventional except for the construction of its manual propulsion wheels 12 with which the present invention is directly associated or inegrated.

The anti-rollback mechanism forming the subject matter of the invention comprises a stationary annular race 13 having a V-cross section at its periphery and being inside of and concentric with the rim 14 of the propulsion wheel 12 which includes a suitable rubber tire 15 on the rim 14.

The annular race 13 has an integral strut 16 extending across its diameter and this strut is rigidly secured to the chair frame 11 at two points near its top and bottom by frame clamps or connectors 17. At the center of each wheel 12, the strut 16 includes a hub 18 which receives a frame attached axle bolt 19 defining the center of each wheel 12, spacer means 20 being provided between the frame and the hub 18.

Figure 3:
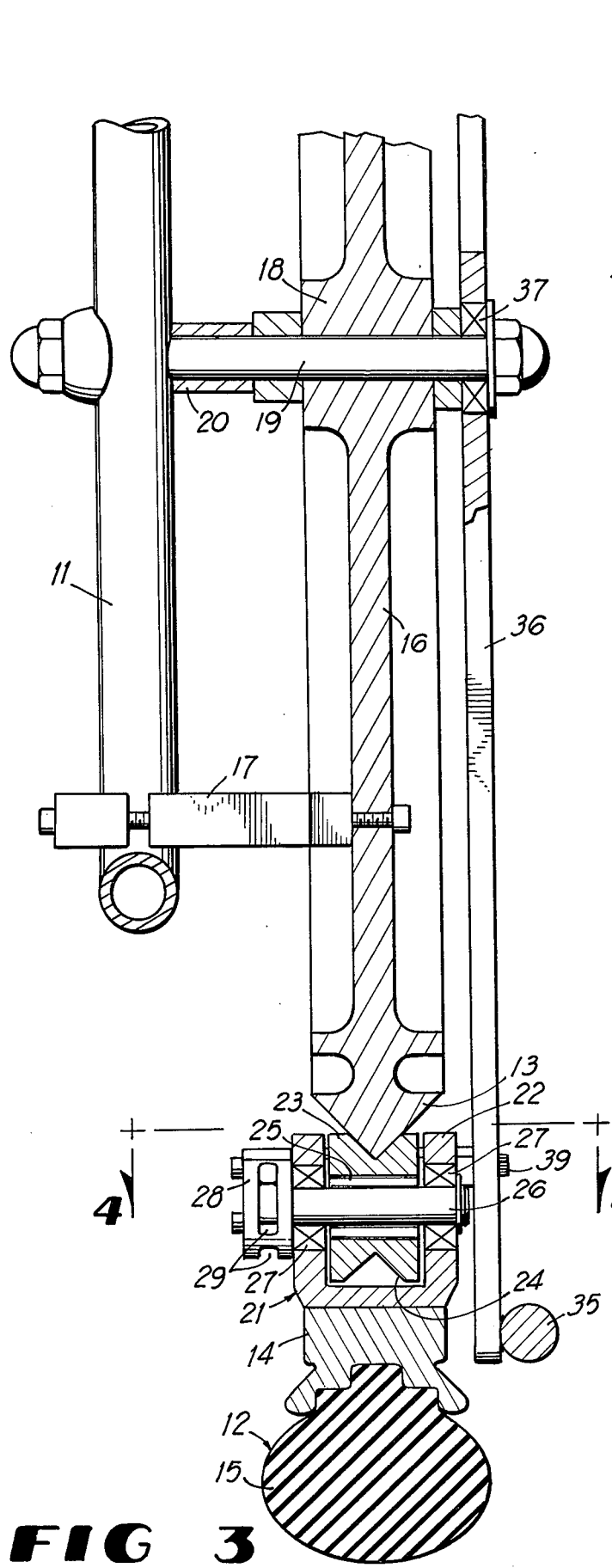
FIG. 3 is a cross sectional view taken on line 3—3 of FIG. 2.
Figure 4:
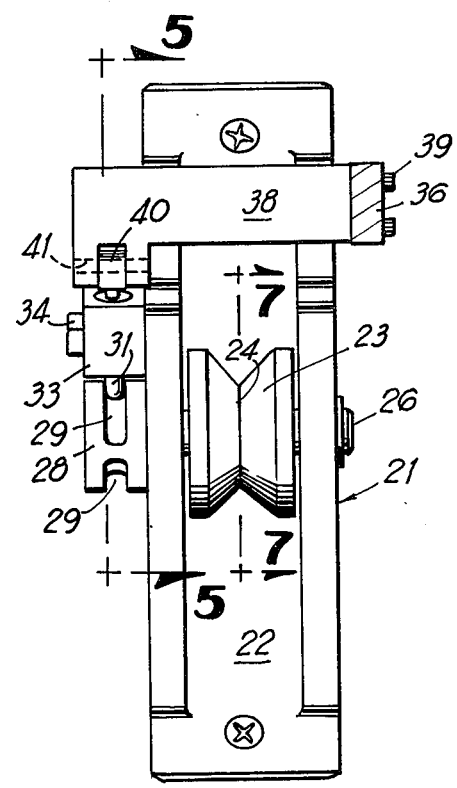
FIG. 4 is a fragmentary plan view taken on line 4—4 of FIG. 3.
Figure 5:
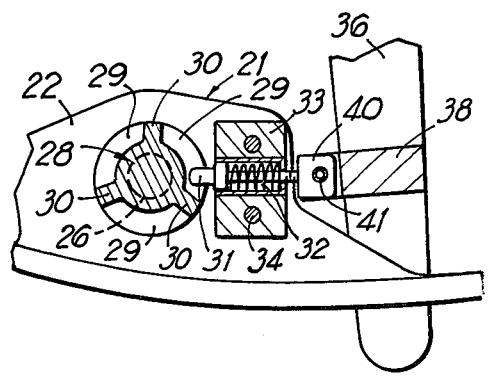
FIG. 5 is a fragmentary vertical section taken on line 5—5 of FIG. 4.

The wheel rim 14 which orbits the race 13 in the normal operation of the chair has fixed thereto at three circumferentially equidistantly spaced locations anti-rollback clutch devices 21. Each such device or mechanism comprises a U-cross section frame 22 fixed to the interior of the rim 14 between the rim and the race 13 and being centered with respect to the latter, FIG. 3. Each device 21 includes a comparatively small follower roller 23 having a V-groove 24 to engage with the race 13 of like cross section and rollingly follow the latter during movement of the chair. Each follower roller 23 has conventionally built into it, FIG. 7, a sprag clutch 25 which renders the roller 23 one-way freewheeling to allow forward movement of the chair at any time, and one-way locking with respect to a shaft 26 on which the roller and clutch are mounted between the side walls of each frame 22. The shaft 26 is mounted in bearings 27 held in the side walls of the frames 22.

Each shaft 26 at its interior end and immediately inwardly of the frame 22 carries a lost motion stop roller 28 securely fixed thereto and having three circumferential slots 29 in its periphery separated by radial webs 30. The slots 29 are adapted to receive a locking or stop pin 31 biased toward the roller 28 by a spring 32 disposed within a cavity of a mounting block 33 secured by fastener means 34 to the interior side of the frame 22. As will be further described, the stop pin 31, when biased toward the roller 28, enters one of the slots 29 and lies in the path of movement of the webs 30 to prevent the roller 28 and its shaft 26 from turning more than ⅓ of a revolution in the direction tending to move the chair rearwardly while the clutch 25 is active.

As thus far described, the invention provides an automatic anti-rollback means for the wheelchair and allows the chair to roll forwardly at all times without resort to any control mechanism outside of the wheels 12. It should be understood that each wheel 12 is equipped with the above-described anti-rollback mechanism. It should also be understood that while the mechanism has been described in terms of three units 21, it will be feasible in some cases to employ a greater or lesser number of units on the two wheels 12.

To enable a chair occupant to propel the chair in a backward mode whenever desired through use of the customary hand propulsion ring 35 at the outer side of each wheel 12, a disengage means for the anti-rollback mechanism is provided. This means comprises a spider 36 consisting of three circumferentially spaced radial arms or spoke-like members, attached as by welding to the propulsion ring 35 near their tips. The center of the spider 36 through a bearing 37 is journaled on the wheel axle bolt 19. The ring 35 is rotatably mounted on the adjacent wheel 12. It is restrained against axial displacement outwardly from the side of the wheel by the sliding restraint of block 40 and pin 31 in the cavity of block 33. Further, the rotation of the ring 35 relative to wheel 12 is limited in forward travel of the chair by contact of the block 40 with mounting block 33, and is limited in reverse travel of the chair by the pin 31 as it compresses the spring 32 solid in the cavity of the mounting block 33. Thus, in effect, two travel limiting stops forming a lost motion connection are provided for turning the wheel 12 in either direction through manual force on the ring 35.

Figures 6, 7:
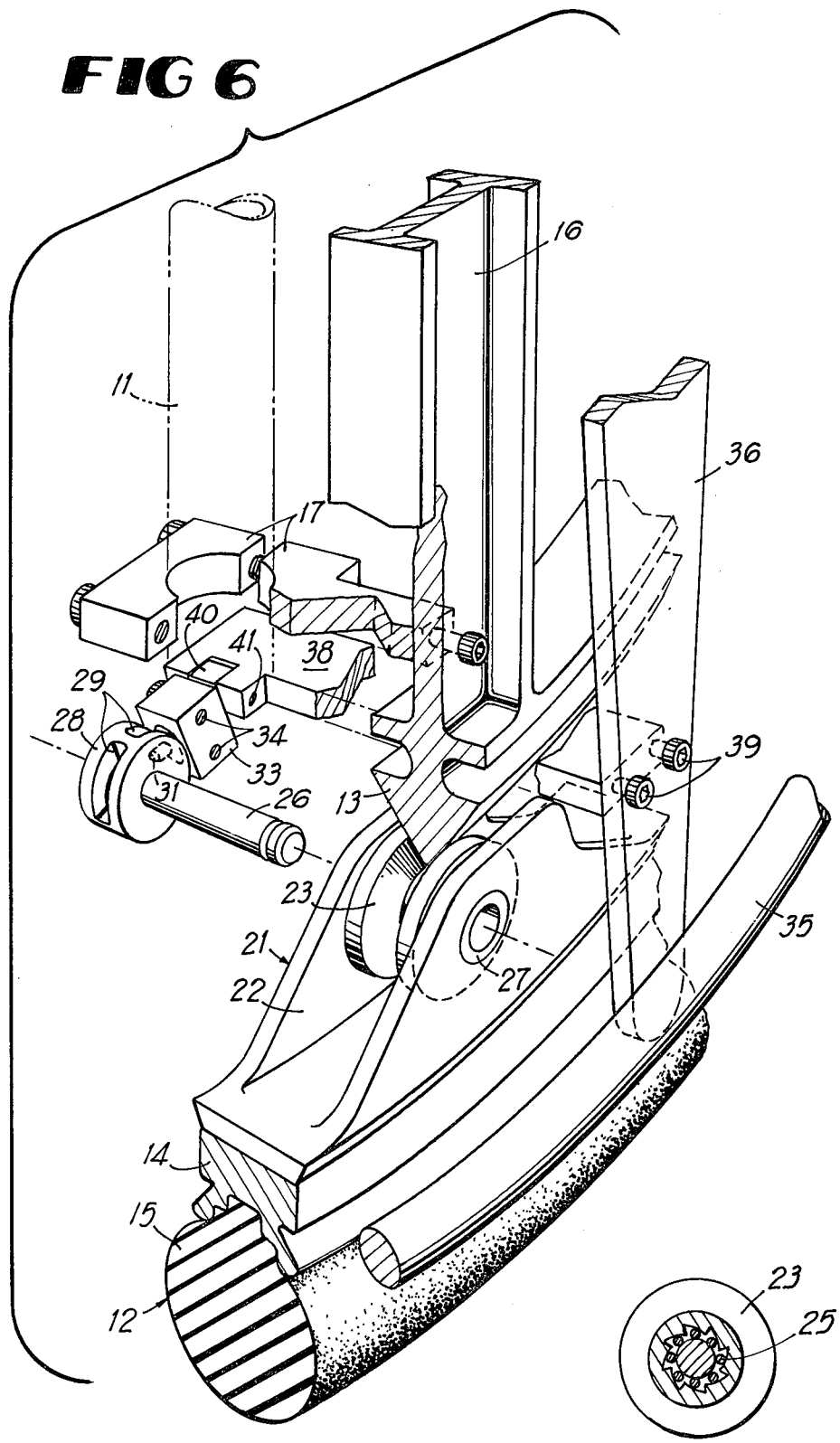
FIG. 6 is a fragmentary perspective view, partly in cross section, depicting the heart of the wheel-attached anti-rollback mechanism.
FIG. 7 is a vertical section taken on line 7—7 of FIG. 4.

An actuator bar 38 is fixed to one arm of the spider 36 as by screws 39 and projects inwardly of the adjacent wheel 12 in the space between the race 13 and wheel rim 14 to a point near and spaced from the mounting block 33, FIG. 6. Another block 40 pivoted by a pin 41 to the actuator bar 38 has a threaded opening which receives the rear screw-threaded end of spring-biased locking or stop pin 31. Thus, an articulated connection is formed between the actuator bar 38 and biased stop pin 31.

When hand pressure is applied by the occupant at any time to the ring 35 for propelling the chair forwardly, the follower rollers 23 of each wheel 12 are in a free-wheeling mode because the associated sprag clutches 25 are not engaged, and the wheel rim and follower rollers 23 can freely orbit around the fixed race 13 and hence the chair moves forwardly.

If undesired backward rolling of the chair tends to occur at any time, the follower rollers 23 through their one-way active clutches 25 become locked to the shafts 26 and the latter tend to rotate with the lost motion stop rollers 28. However, the stop pins 31 at this time, being biased into the slots 29, prevent any significant rotation of the stop rollers 28 and their shafts 26, and hence the wheelchair cannot roll rearwardly beccause of the one-way engaging clutches.

However, when the chair occupant wishes to propel the wheelchair in a backward mode and applies hand pressure to the ring 35 for this purpose, there will be a resulting movement of the spider 36 and attached actuating bar 38. This results in a movement of the pivoted block 40 which is attached to the rear end of stop pin 31. Therefore, the stop pin will be retracted from the slots 29 and will be clear of the webs 30 of lost motion stop rollers 28, thus freeing the latter to turn with the shafts 26 in the proper direction to allow backward movement of the chair.

When the component releases the ring 35 and thus relieves the pressure on the spider 36 and actuator bar 38, the stop pins 31 under influence of the springs 32 will re-enter the slots 29 and prevent any unwanted backward movement of the chair while again permitting free forward movement.

The mechanism is reliable, convenient and very safe. Its use does not effect in any way the occupant's constant control of the wheelchair through grasping the propulsion rings 35 with the hands. No separate controls for the anti-rollback mechanism are involved. The essence of the invention resides in having the entire mechanism built into the wheels 12 rather than being an external attachment acting on the wheels through external controls. Simplicity of construction as well as compactness are also achieved by integrating the anti-rollback mechanism in the two propulsion wheels of the chair.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. In a wheelchair having manual propulsion wheels, an anti-rollback mechanism for each manual propulsion wheel comprising a frame attached to such wheel, a follower roller on said frame having a one-way freewheeling and one-way engaging clutch, a support shaft for the follower roller journaled on said frame and being driven in rotation by the clutch when the clutch is engaged, a rotation blocking element secured to said shaft, a biased stop element on the propulsion wheel positioned to stop rotation of said blocking element and shaft in the direction to cause backward rolling of said chair, disengage means interconnecting the biased stop element and manual propulsion wheel whereby manual pressure on the wheel to cause intentional backward rolling of the wheelchair releases the biased stop element from said blocking element, and a relatively stationary raceway on the wheelchair for said follower roller around which the roller and manual propulsion wheel may orbit.

2. In a wheelchair as defined in claim 1, said anti-rollback mechanism being formed in plural identical circumferentially spaced units around the circumference of each manual propulsion wheel.

3. In a wheelchair as defined in claim 2, wherein each manual propulsion wheel includes an attached manual propulsion ring, and said disengage means comprises a spider member having radial arms one each for said spaced units and attached to said ring, and actuator devices carried by the arms of the spider member and having connections with said biased stop elements.

4. In a wheelchair as defined in claim 1, wherein said rotation blocking element comprises a blocking roller fixed on said shaft and having circumferentially spaced peripheral cavities intervened by radial stop lugs, and said biased stop element comprising a guided stop pin adapted to enter the cavities between said radial stop elements.

5. In a wheelchair as defined in claim 1, and said disengage means comprising a spoke-like member connected with said propulsion wheel to turn therewith, an actuator bar secured to the spoke-like member and extending from one side thereof to a location near said rotation blocking element, and a two-way lost motion connection between the actuator bar and said biased stop element.

6. In a wheelchair as defined in claim 1, and said raceway comprising a substantially V-cross section ring attached to the wheelchair frame and being concentric with the manual propulsion wheel, and said follower roller having a V-groove engaging and rollingly following said ring forming said raceway.

7. In a wheelchair as defined in claim 6, and said manual propulsion wheel having a wheel rim, and said frame being attached to the interior of said rim in radially aligned relatiohship with said raceway.

8. In a wheelchair of the manually propelled type having hand propulsion wheels, an anti-rollback mechanism for each wheel formed as an integral component of the wheel, the mechanism comprising at least one support element on the wheel, a follower roller on the support element having a one-way freewheeling and one-way engaging clutch, a relatively stationary annular raceway on the wheelchair engaging the follower roller and around which the roller may orbit during rotation of the wheel, a shaft journaled on the support element and being received by the clutch of the follower roller and driven in rotation by the clutch when the clutch is engaging, a rotation blocking element on said shaft including an abutment, a biased stop element on said support element in the path of movement of said abutment, and a disengage mechanism for the biased stop element connected between the latter and said wheel.

9. In a wheelchair as defined in claim 8, and said wheel including an attached manual propulsion ring, and said disengage mechanism including a member rigid with the manual propulsion ring.

10. In a wheelchair as defined in claim 9, and an acutator bar secured to said member, and an articulated connection between the actuator bar and said biased stop element.

11. In a wheelchair of the manually propelled type including hand propulsion wheels, an anti-rollback mechanism for each wheel, said mechanism comprising a support element on the wheel, a roller journaled on the support element and containing a one-way freewheeling and one-way engaging clutch, a relatively stationary annular raceway on the wheelchair engaging said roller and around which the roller orbits during rotation of the wheel, a shaft journaled on the support element and being received by the clutch of said roller and driven in rotation by the clutch when the clutch is engaged, a rotation blocking element on said shaft, a biased stop element on the support element in the path of movement of the rotation blocking element, and a disengage mechanism for the biased stop element connected between the latter and said wheel and including a manual propulsion member for the wheel having limited movement relative to the wheel in opposite directions of rotation of the wheel and forming the control means of said disengage mechanism.

12. In a wheelchair of the manually propelled type having hand propulsion wheels, an anti-rollback mechanism for each wheel, said mechanism comprising a one-way freewheeling and one-way engaging clutch mounted on the wheel, a relatively stationary raceway on the wheelchair rotationally engaging said clutch during rotation of said wheel, a rotation blocking element connected with said clutch and driven by the clutch when the clutch is in an engaged state, a shiftable biased element held in the path of movement of the rotation blocking element, and control means including a manual propulsion member for the wheel having limited movement relative to the wheel in opposite directions of rotation of the wheel and having a lost motion connection with the shiftable biased element.

13. In a wheelchair of the manually propelled type having propulsion wheels moveable by its user in a forward direction, an anti-rollback mechanism for each wheel, said mechanism comprising a one-way freewheeling and one-way brake engaging device, and means for selectively controlling the application of said anti-rollback mechanism, said control means being located on said propulsion wheels in the area of the normal gripping by the user and having limited rearward movement relative to the propulsion wheels to disengage said anti-rollback mechanism, and said control means being a push ring connected by radial spokes to each propulsion wheel in a manner that allows the ring to move relative to said propulsion wheel to disengage said one-way brake engaging device.

14. In a wheelchair of the manually propelled type including occupant controlled propulsion wheels, an anti-rollback mechanism for each propulsion wheel including a shiftable element biased in a direction to activate the anti-rollback mechanism, and control means for the biased shiftable element including a manual propulsion ring near each propulsion wheel and having limited rotational movement relative to said wheel in opposite directions and having a lost motion connection with the biased shiftable element.

* * * * *